(12) United States Patent
Wu et al.

(10) Patent No.: US 11,728,106 B2
(45) Date of Patent: Aug. 15, 2023

(54) KEYBOARD KEY DEVICE

(71) Applicant: SUNREX TECHNOLOGY CORP., Taichung (TW)

(72) Inventors: Chih-Hsien Wu, Taichung (TW); Shih-Pin Lin, Taichung (TW); Li-Ling Huang, Taichung (TW); Hsiang-Yi Chen, Taichung (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 17/443,660

(22) Filed: Jul. 27, 2021

(65) Prior Publication Data

US 2022/0293356 A1 Sep. 15, 2022

(30) Foreign Application Priority Data

Mar. 9, 2021 (TW) .................................. 110108355

(51) Int. Cl.
| | |
|---|---|
| *H01H 13/02* | (2006.01) |
| *H01H 13/14* | (2006.01) |
| *F21V 8/00* | (2006.01) |
| *H01H 13/20* | (2006.01) |

(52) U.S. Cl.
CPC ......... *H01H 13/023* (2013.01); *G02B 6/0036* (2013.01); *G02B 6/0091* (2013.01); *H01H 13/14* (2013.01); *H01H 13/20* (2013.01)

(58) Field of Classification Search
CPC ...... H01H 13/023; H01H 13/14; H01H 13/20; H01H 3/12; H01H 3/125; H01H 13/70; H01H 13/7065; H01H 13/83; H01H 2219/036; H01H 2219/054; H01H 2219/056; H01H 2219/06; H01H 2219/062; H01H 13/02; G02B 6/0036; G02B 6/0091; F21V 8/00
See application file for complete search history.

(56) References Cited

U.S. PATENT DOCUMENTS

| | | | | |
|---|---|---|---|---|
| 11,221,515 B1 * | 1/2022 | Wu | ...................... | G02B 6/0073 |
| 2007/0235306 A1 * | 10/2007 | Chiba | ..................... | H01H 13/83 |
| | | | | 200/314 |
| 2014/0166456 A1 * | 6/2014 | Chen | ...................... | H01H 13/83 |
| | | | | 200/5 A |

* cited by examiner

*Primary Examiner* — Lheiren Mae A Caroc
(74) *Attorney, Agent, or Firm* — Burris Law, PLLC

(57) ABSTRACT

A keyboard key device includes a keycap and a substrate unit. The substrate unit includes a light-emitting component, a light guide plate, and a light transmission plate. The light guide plate has first and second end surfaces, and at least one light-condensing hole. The first end surface is formed with an uneven microstructure for diffuse reflection of light rays. The light transmission plate has first and second side surfaces, and an outer reflective layer coated on the second side surface. A portion of light rays emitted from the light-emitting component and into the light transmission plate pass through the outer reflective layer, and the remainder of the light rays are reflected by the outer reflective layer.

10 Claims, 5 Drawing Sheets

KEYBOARD KEY DEVICE

CROSS-REFERENCE TO RELATED APPLICATIONS

This application claims priority of Taiwanese Patent Application No. 110108355, filed on Mar. 9, 2021.

FIELD

The disclosure relates to an input device, more particularly to a keyboard key device having characters with homogeneous brightness.

BACKGROUND

A standard keyboard includes a circuit board, a plurality of key switches arranged on a top surface of the circuit board, and a plurality of keycaps that are movable relative to the key switches for triggering the key switches. Characters are printed on top surfaces of the keycaps, so that a user of the standard keyboard can identify the symbols of the keys during operation. A keyboard with a backlight module has been developed in recent years to allow the user to use the keyboard in the dark. The keyboard with a backlight module is similar to the aforementioned standard keyboard. Instead of presenting the characters in print on the keycap, the region of the keycap's character parts are made light-transmissive, and the remaining part is not light-transmissive. A backlight module is arranged between the circuit board and the keycaps so that light rays emitted by the backlight module pass through the parts of the characters of the keycaps. In this way, even in the dark, the user can recognize the keycaps' characters through the light rays generated by the backlight module and operate without difficulty. However, a backlight module typically includes multiple light-emitting elements disposed respectively to illuminate the keycaps. When the character part of each keycap consists of multiple alphanumeric characters, the light rays emitted by the light-emitted elements may be excessively concentrated which causes one character or some of the characters to be brighter than other characters, thereby making the characters of the keycaps less visually pleasing or even difficult to recognize, and resulting in poor user experience which would hinder product sales.

SUMMARY

Therefore, the object of the disclosure is to provide a keyboard key device having characters with homogeneous brightness.

According to the disclosure, a keyboard key device includes a keycap, a substrate unit, and a support unit.

The keycap has a main body part that is not light-transmissive, a primary character part that is connected to the main body part and that is light-transmissive, and at least one secondary character part that is connected to the main body part and that is light-transmissive, such that light rays irradiated on one side of the keycap are allowed to transmit through the primary character part and the at least one secondary character part to the other side of the keycap.

The substrate unit and the keycap are arranged in an axial direction. The substrate unit includes a circuit board, a light-emitting component, a light guide plate, and a light transmission plate. The light-emitting component projects from the circuit board toward the keycap. The light guide plate is disposed at a side of the circuit board facing the keycap, and has opposite first and second end surfaces, a through hole, and at least one light-condensing hole. The first and second end surfaces are respectively proximate to and distal from the circuit board. The first end surface is formed with an uneven internal microstructure for diffuse reflection of light rays. The through hole extends through the first and second end surfaces. The light-emitting component extends into the through hole. The primary character part of the keycap and the through hole are aligned with each other in the axial direction. The at least one second character part of the keycap and the at least one light-condensing hole are aligned with each other in the axial direction. The light transmission plate is disposed at a side of the light guide plate facing the keycap, and has opposite first and second side surfaces, and an outer reflective layer. The first and second side surfaces are respectively proximate to and distal from the light guide plate. The outer reflective layer is made of a reflective material and is coated on the second side surface, such that a portion of light rays which are emitted from the light-emitting component and into the light transmission plate pass through the outer reflective layer, and that the remainder of the light rays are reflected by the outer reflective layer to propagate into the light guide plate to the microstructure of the first end surface.

The support unit extends in the axial direction and interconnects the keycap and the substrate unit such that the keycap is movable relative to the substrate unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
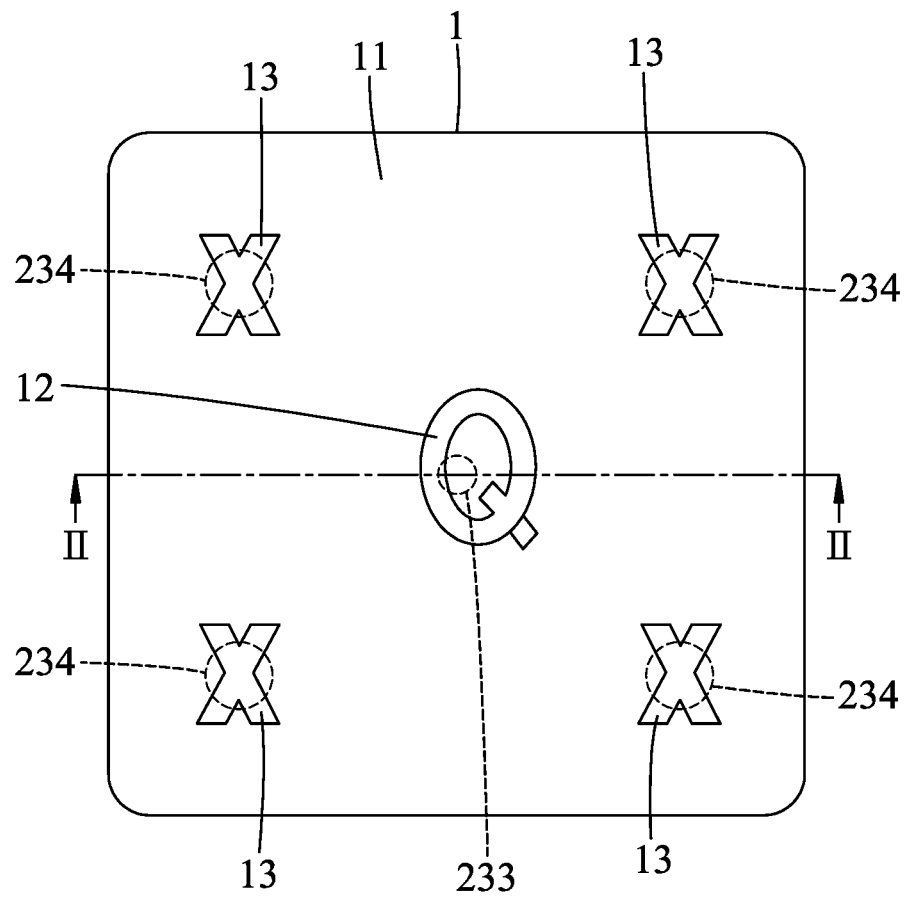
FIG. 1 is a top view of an embodiment of a keyboard key device according to the disclosure.
Figure 2:
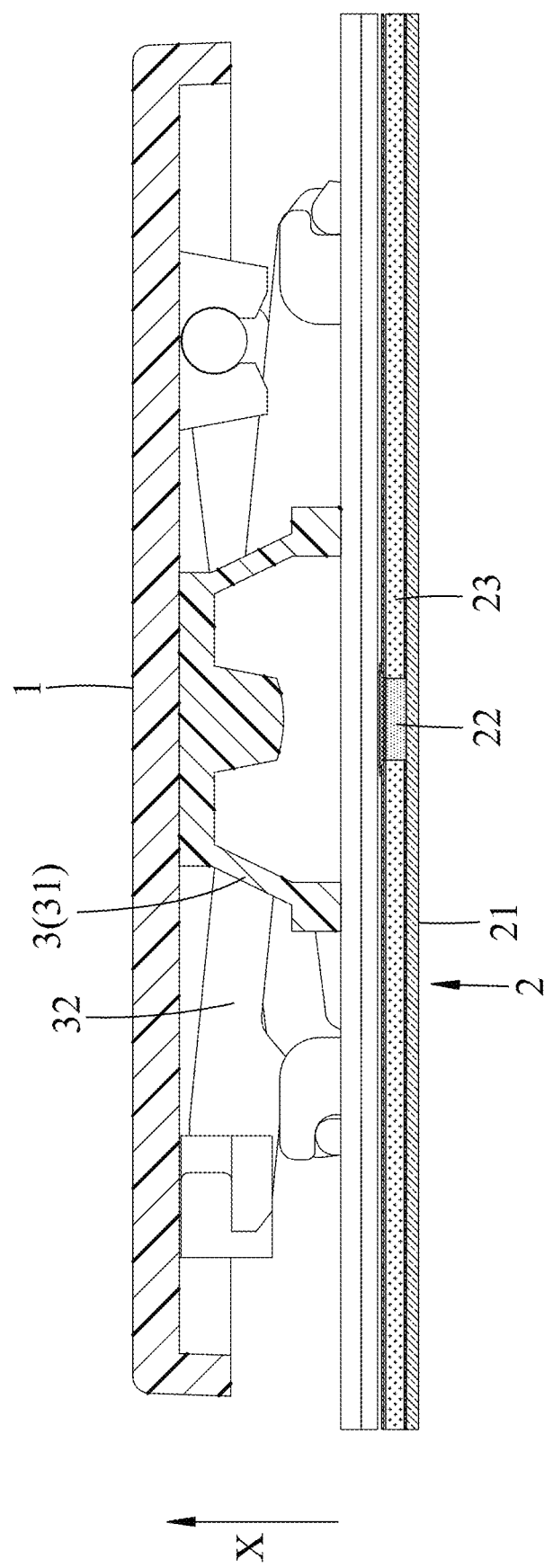
FIG. 2 is a cross-sectional view taken along line II-II in FIG. 1.
Figure 3:
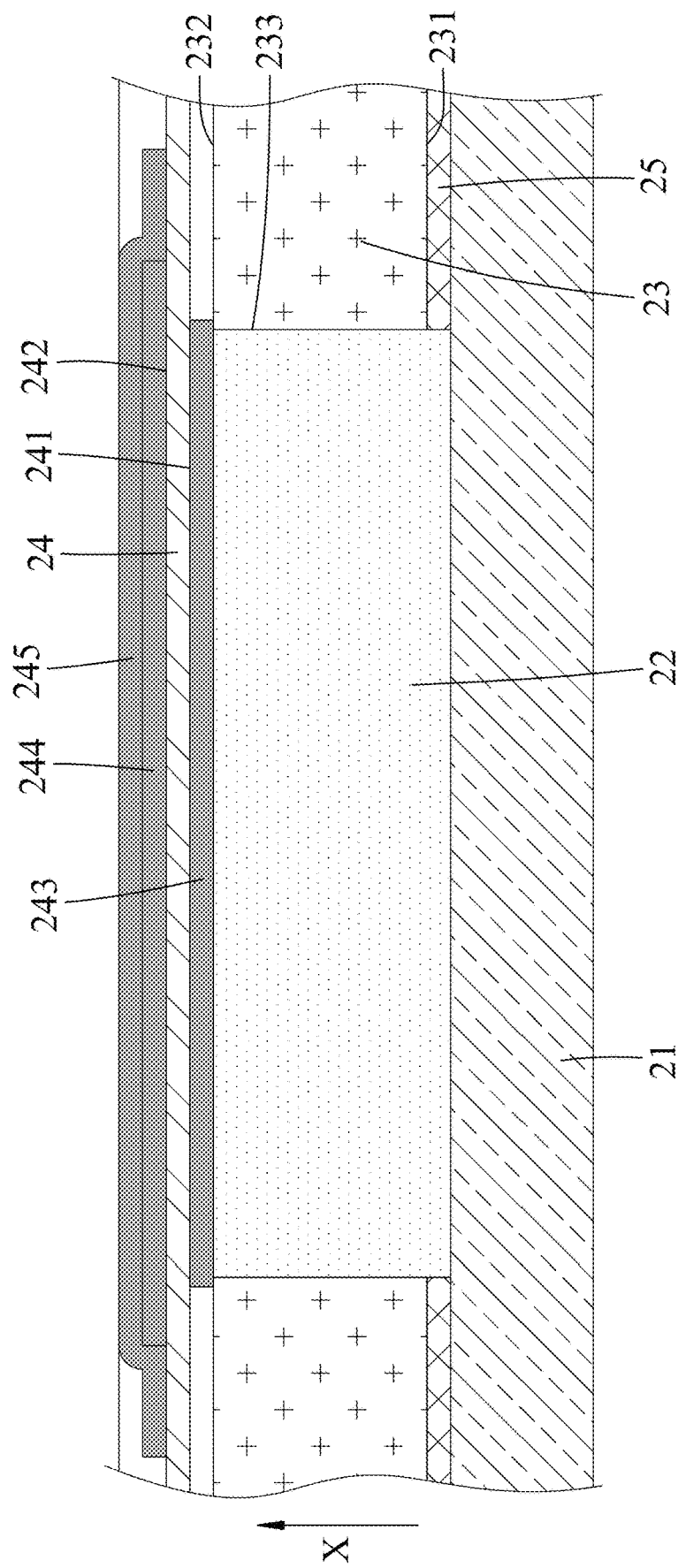
FIG. 3 is a fragmentary enlarged view of FIG. 2.

As shown in FIGS. 1 to 3, the embodiment of a keyboard key device includes a keycap 1, a substrate unit 2, and a support unit 3.

In this embodiment, the keycap 1 has a main body part 11 that is not light-transmissive, a primary character part 12 that is connected to the main body part 11 and that is light-transmissive, and four secondary character parts 13 that are connected to the main body part 11 and that is light-transmissive, such that light rays irradiated on one side of the keycap 1 are allowed to transmit through the primary character part 12 and the secondary character parts 13 to the other side of the keycap 1.

The substrate unit 2 and the keycap 1 are arranged in an axial direction (X). The substrate unit 2 includes a circuit board 21, a light-emitting component 22 projecting from the circuit board 21 toward the keycap 1, a light guide plate 23 disposed at a side of the circuit board 21 facing the keycap 1, a light transmission plate 24 disposed at a side of the light guide plate 23 facing the keycap 1, and a reflector sheet 25 sandwiched between the light guide plate 23 and the circuit board 21.

Figure 4:
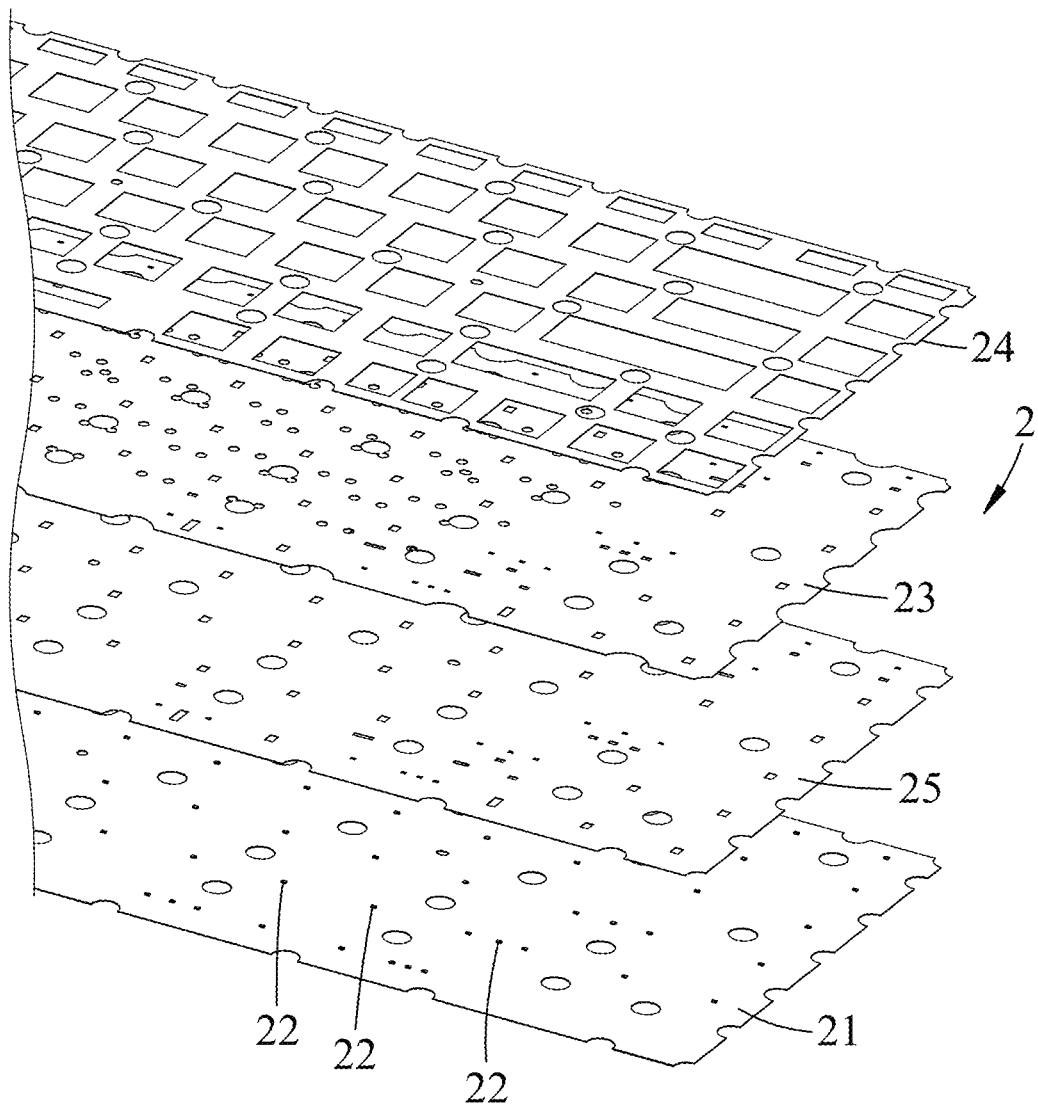
FIG. 4 is a fragmentary exploded perspective view of a substrate unit of the embodiment.

In this embodiment, the light-emitting component 22 is a light-emitting diode (LED) which can be easily controlled by an electric signal, and white light, monochromatic light, or various light colors, e.g., may be obtained by using RGB color model. It should be noted that, while the keyboard key device according to the disclosure is exemplified using only one keycap 1 and one light-emitting component 22, multiple keycaps 1 and light-emitting components 22 may be employed with the light-emitting components 22 being mounted on the circuit board 21 (as shown in FIG. 4) and arranged to be aligned respectively with the keycaps 1.

Figure 5:
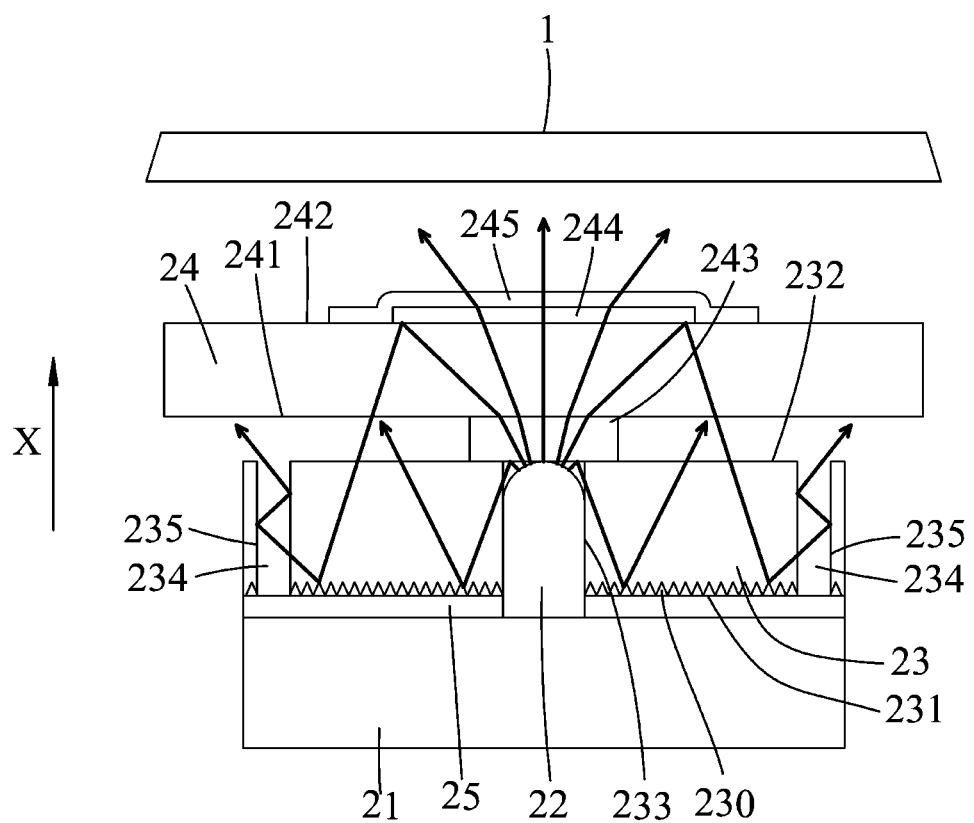
FIG. 5 is a schematic side view illustrating propagating directions of light rays.

In this embodiment, the light guide plate 23 has opposite first and second end surfaces 231, 232 being respectively proximate to and distal from the circuit board 21, a through hole 233 extending through the first end surface 231 and the second end surface 232, four light-condensing holes 234 extending through the first end surface 231 and the second end surface 232, and four hole-defining surfaces 235 respectively defining the light-condensing holes 234 as illustrated in FIG. 5. The first end surface 231 is formed with an uneven microstructure 230 for diffuse reflection of light rays. The primary character part 12 of the keycap 1 and the through hole 233 are aligned with each other in the axial direction (X). The light-emitting component 22 extends into the through hole 233. The four second character parts 13 of the keycap 1 are aligned respectively with the four light-condensing holes 234 in the axial direction (X).

It should be particularly noted that, although the light-condensing holes 234 extend through the first end surface 231 and the second end surface 232 in this embodiment, the light-condensing holes 234 may alternatively be blind holes in other embodiments. Moreover, in this embodiment, each hole-defining surface 235 is cylindrical, but may be rectangular prism, hexagonal prism, or other shapes in other embodiments.

The light transmission plate 24 has opposite first and second side surfaces 241, 242 that are respectively proximate to and distal from the light guide plate 23. The light transmission plate 24 further has an inner reflective layer 243 that is coated on the first side surface 241, an outer reflective layer 244 that is coated on the second side surface 242, and a light-absorbing layer 245 that is coated on the second side surface 242 and that covers the outer reflective layer 244. Both the inner reflective layer 243 and the outer reflective layer 244 are made of a reflective material. The light-absorbing layer 245 is made of a light-absorbing material. The inner reflective layer 243 is coated on an area of the first side surface 241 that is aligned with the through hole 233 in the axial direction (X) and that is misaligned with the light-condensing holes 234 in the axial direction (X). Each of the outer reflective layer 244 and the light-absorbing layer 245 is coated on an area of the second side surface 242 that is aligned with the through hole 233 in the axial direction (X) and that is misaligned with the light-condensing holes 234 in the axial direction (X).

In this embodiment, the inner reflective layer 243 and the outer reflective layer 244 are formed by printing with white ink, abut may also be made from other reflective materials as required. Also, in this embodiment, the light-absorbing layer 245 is formed by printing with black ink, but may also be made from other types of light-absorbing materials as required.

The support unit 3 extends in the axial direction (X) and interconnects the keycap 1 and the substrate unit 2 such that the keycap 1 is movable relative to the substrate unit 2 in the axial direction (X). Specifically, as shown in FIG. 2, the support unit 3 includes a rubber dome 31 and a scissors-type linkage 32 disposed around the rubber dome 31. However, this is only an exemplification; modifications and changes may be suggested by those skilled in the art in other embodiments.

In this embodiment, the keycap 1 is exemplified by having only one primary character part 12 located at the center of the keycap 1 with one light-emitting component 22 and one through hole 233 being arranged to be aligned with the keycap 1, but multiple primary character parts 12 and corresponding multiple through holes 233 and light-emitting components 22 may be employed in other embodiments. Moreover, the number of the secondary character parts 13 and the corresponding light-condensing holes 234 may vary in other embodiments.

In this embodiment, the light emitted by the light-emitting component 22 passes out of the through hole 233 to the light transmission plate 24 along paths depicted by the arrow lines in FIG. 5. Specifically, when the light encounters the inner reflective layer 243, only a portion of light rays pass through the inner reflective layer 243 into the light transmission plate 24, and the remainder of the light rays are reflected by the reflective layer 243 to propagate into the light guide plate 23 to the first end surface 231. The light rays penetrating the inner reflective layer 243 further propagate to the outer reflective layer 244. When the light rays encounter the outer reflective layer 244, only a portion of the light rays pass through the outer reflective layer 244, and the remainder of the light rays are reflected by the outer reflective layer 244 to propagate into the light guide plate 23 to the first end surface 231. Since the first end surface 231 is formed with an uneven microstructure 230, diffuse reflection of the light rays will occur when the light rays are irradiated on the first end surface 231. The diffuse reflection reflects the light rays at various angles to pass out of the light guide plate 23 via the second end surface 232 to the light transmission plate 24, or via the hole wall surfaces 235 into the light-condensing holes 234.

A portion of the light rays transmitted through the outer reflective layer 244 pass through the light-absorbing layer 245 and propagate to the primary character part 12 of the keycap 1 so that the primary character part 12 is illuminated. The remainder of the light rays are absorbed, thereby softening the brightness of the primary character part 12.

The hole-defining surfaces 235 serve to repeatedly reflect the light rays propagated through the hole-defining surfaces 235 into the light-condensing holes 234. Afterwards, the condensed light rays propagate to the secondary character parts 13 of the keycap 1 so that the secondary character parts 13 are illuminated. The light-condensing effect enhances the brightness of the secondary character parts 13.

In this way, the brightness of the primary character part 12 and the four secondary character parts 13 in this embodiment can be made homogeneous. Therefore, the overall illumination of the keycap 1 looks soft and comfortable. The visual appeal of the keyboard is better, which helps to promote the user experience and is conducive to sales.

It is also noted that, since the light rays may also penetrate through the first end surface 231 of the light guide plate 23, the reflector sheet 25 is provided to reflect the light rays from the light guide plate 23 back to the light transmission plate 24 and the light guide plate 23, thereby improving the utilization of light.

Furthermore, since the circuit board 21, the reflector sheet 25, the light guide plate 23, and the light transmission plate 24 in the present embodiment are arranged in parallel to one another, the structure is relatively simple, lightweight, and thin. In turn, a keyboard of the present embodiment can have reduced weight and thickness to meet the user's needs.

In summary, the present disclosure utilizes the diffuse reflection through an uneven microstructure 230 of the first end surface 231, and it produces a light-condensing effect at the light-condensing holes 234, thereby providing similar amount of illumination to the primary character part 12 and the secondary character parts 13 of the keyboard key and allow the primary character part 12 and the secondary character parts 13 to have similar brightness. Therefore, the purpose of the invention can be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A keyboard key device comprising:
   a keycap having a main body part that is not light-transmissive, a primary character part that is connected to said main body part and that is light-transmissive, and at least one secondary character part that is connected to said main body part and that is light-transmissive, such that light rays irradiated to one side of said keycap are allowed to transmit through said primary character part and said at least one secondary character part to another side of said keycap;
   a substrate unit, said substrate unit and said keycap being arranged in an axial direction, said substrate unit including
      a circuit board,
      a light-emitting component that projects from said circuit board toward said keycap,
      a light guide plate that is disposed at a side of said circuit board facing said keycap, and that has
         opposite first and second end surfaces being respectively proximate to and distal from said circuit board, said first end surface being formed with an uneven internal microstructure for diffuse reflection of light rays,
         a through hole extending through said first and second end surfaces, said light-emitting component extending into said through hole, said primary character part of said keycap and said through hole being aligned with each other in said axial direction, and
         at least one light-condensing hole, said at least one second character part of said keycap and said at least one light-condensing hole being aligned with each other in said axial direction, and
      a light transmission plate that is disposed at a side of said light guide plate facing said keycap, and that has
         opposite first and second side surfaces being respectively proximate to and distal from said light guide plate, and
         an outer reflective layer made of a reflective material and coated on said second side surface, such that a portion of light rays which are emitted from said light-emitting component and into said light transmission plate pass through said outer reflective layer, and that a remainder of said light rays are reflected by said outer reflective layer to propagate into said light guide plate to said microstructure of said first end surface; and
   a support unit extending in said axial direction and interconnecting said keycap and said substrate unit such that said keycap is movable relative to said substrate unit.

2. The keyboard key device as claimed in claim 1, wherein said at least one light-condensing hole of said light guide plate extends through said first end surface and said second end surface.

3. The keyboard key device as claimed in claim 2, wherein said light guide plate further has at least one hole-defining surface that defines said at least one light-condensing hole and that is disposed for repeatedly reflecting light rays passing through said at least one hole-defining surface into said at least one light-condensing hole.

4. The keyboard key device as claimed in claim 1, wherein said outer reflective layer of said light transmission plate is coated on an area of said second side surface that is aligned with said through hole in said axial direction and that is misaligned with said at least one light-condensing hole in said axial direction.

5. The keyboard key device as claimed in claim 1, wherein said light transmission plate further has an inner reflective layer made of a reflective material and coated on said first side surface, such that a portion of light rays which are emitted from said light-emitting component pass through said inner reflective layer into said light transmission plate, and that the remainder of said light rays are reflected by said inner reflective layer to propagate into said light guide plate to said microstructure of said first end surface.

6. The keyboard key device as claimed in claim 5, wherein said inner reflective layer of said light transmission plate is coated on an area of said first side surface that is aligned with said through hole in said axial direction and that is misaligned with said at least one light-condensing hole in said axial direction.

7. The keyboard key device as claimed in claim 1, wherein said light transmission plate further has a light-absorbing layer made of a light-absorbing material and coated on said second side surface and covering said outer reflective layer, said light-absorbing layer is made of light-absorbing material such that a portion of light rays are absorbed when passing out of said light transmission plate through said light-absorbing layer.

8. The keyboard key device as claimed in claim 7, wherein said light-absorbing layer is coated on an area of said second side surface that is aligned with said through hole in said axial direction and that is misaligned with said at least one light-condensing hole in said axial direction.

9. The keyboard key device as claimed in claim 1, wherein said substrate unit further includes a reflector sheet sandwiched between said light guide plate and said circuit board for reflecting light rays from said light guide plate.

10. The keyboard key device as claimed in claim 1, wherein said support unit includes a rubber dome and a scissors linkage disposed around said rubber dome.

\* \* \* \* \*